CRYOGENIC MEMORY CIRCUIT

Filed April 24, 1958 3 Sheets-Sheet 1

INVENTOR.
LLOYD P. HUNTER
BY
Brumbaugh, Free, Graves & Donohue
his ATTORNEYS.

INVENTOR.
LLOYD P. HUNTER
BY
Brumbaugh, Free, Graves & Donohue
his ATTORNEYS.

Nov. 20, 1962 L. P. HUNTER 3,065,459
CRYOGENIC MEMORY CIRCUIT
Filed April 24, 1958 3 Sheets-Sheet 3

INVENTOR.
LLOYD P. HUNTER
BY
Brumbaugh, Free, Graves & Donohue
his ATTORNEYS.

United States Patent Office 3,065,459

Patented Nov. 20, 1962

3,065,459

CRYOGENIC MEMORY CIRCUIT

Lloyd P. Hunter, Leende, Netherlands, assignor to International Business Machines Corporation, New York, N.Y., a corporation of New York Filed Apr. 24, 1958, Ser. No. 730,718

2 Claims. (Cl. 340—173.1)

This invention relates to cryogenic memory circuits and, particularly, to a multidimensional system utilizing superconductive materials for storing digital information.

Previous devices of the type to which the present invention relates involve the use of such circuit components as magnetic cores, acoustic delay lines, electrostatic storage tubes, magnetic drums and the like. Each of these systems embodies characteristics which are unique with the respective components forming the operative elements of the circuits. For example, a system embodying magnetic cores utilizes the magnetic hysteresis properties of appropriate materials and other systems make use of nonlinear ferroelectric condensers whose charge-voltage diagrams resemble the B—H curve for magnetic materials.

The present invention utilizes the phenomenon of superconductivity which permits persistent currents to be induced in a closed current path. Since the resistance of material in the superconductive state is zero, a closed current path formed of such material permits a persistent current to continue circulating in the path without the continuous application thereto of an external source of electrical energy. Such a current flow is interrupted by rendering a portion of the path resistive for a time sufficient to dissipate the current.

A circuit constructed and arranged in accordance with the principles of the present invention may be utilized to store information as, for example, a binary "1" and a binary "0" which, if desired, may arbitrarily be represented by the presence and absence of a persistent current or vice versa. Alternatively, persistent currents in the same direction may have different amplitudes which may be designated as binary "1" and binary "0." Also, it follows that persistent currents circulating in opposite directions could be designated binary "1" and binary "0," if desired.

In a selected component of the circuit in which persistent current direction represents binary information, the current may be established in a preselected direction to represent binary information upon read-out. For example, if the current direction is reversed in the read-out process, this may be detected by a suitable sensing means and designated as a binary "1." On the other hand, if there is no reversal in the current direction upon read-out, this may be detected by a suitable sensing means and designated as a binary "0."

In a circuit component where persistent current amplitude represents binary information, the current in a selected component may be established at the amplitude representative of a preselected binary information upon read-out. By way of example, if there is a change in current amplitude upon read-out, this may be detected by a suitable sensing means and designated as a binary "1." On the other hand, if there is no change in current amplitude upon read-out, this may be detected by the sensing means and designated as a binary "0."

For the particular circuit selected to illustrate the principles of the present invention, which will be described in greater detail presently, the presence of a persistent current is chosen arbitrarily to designate a binary "1," and an absence of a persistent current is chosen arbitrarily to designate a binary "0." In this circuit, each storage unit is formed of superconductive material with a means to establish a persistent current in selected units and an additional means to sense, during a READ interval, the presence or absence of a persistent current in several units.

To develop a persistent current in a superconductive unit according to the present invention, an electric current is caused to flow through the unit. Then, a magnetic field greater than the critical field is applied to a portion of the unit to restore that portion to its normal resistive value. The normal resistance of this portion of the loop causes the current to flow entirely in the superconductive portion of the unit. Then, the magnetic field is removed thereby permitting the entire loop to return to its superconductive state and, upon the removal of the source of current to the unit, a persistent current remains, circulating within the unit indefinitely.

The presence of a persistent current in a storage unit is sensed during a READ interval by sensing the presence or absence of a magnetic field about the storage unit. A changing magnetic field is produced by restoring a portion of the unit to its normal resistive state and the dissipation of the persistent current therein.

Basically, one unit in a circuit constructed in accordance with the present invention includes a ring of superconductive material, means to supply current to this ring, further means to apply a magnetic field to at least a portion of the superconductive ring to control the distribution of the current therein so that at least a portion of the current may be caused to persist in the ring, and a sensing means to detect the persistent current. Of course, any desired material or combination or alloys of materials may be utilized in the storage units of the invention, it only being essential that the materials selected be capable of exhibiting a superconductive characteristic.

Accordingly, it is an object of the present invention to provide a new and improved memory system employing superconductive materials.

A still further object of the present invention is to provide a storage unit using the principles of superconductivity in a new and improved circuit arrangement.

Another object of the present invention is to provide a new and improved information storage matrix of superconductive materials wherein the presence or absence of persistent current represents stored binary information.

Still another object of the present invention is to provide a storage unit of superconductive materials in a new and improved circuit arrangement for operation as a high speed memory system.

The invention further resides in certain novel features of circuit arrangement and further objects and advantages thereof will become apparent to those skilled in the art to which it pertains from the following description of the present preferred embodiment thereof described with respect to the accompanying drawings in which similar reference characters represent corresponding parts in the several views, and in which.

Figure 1:
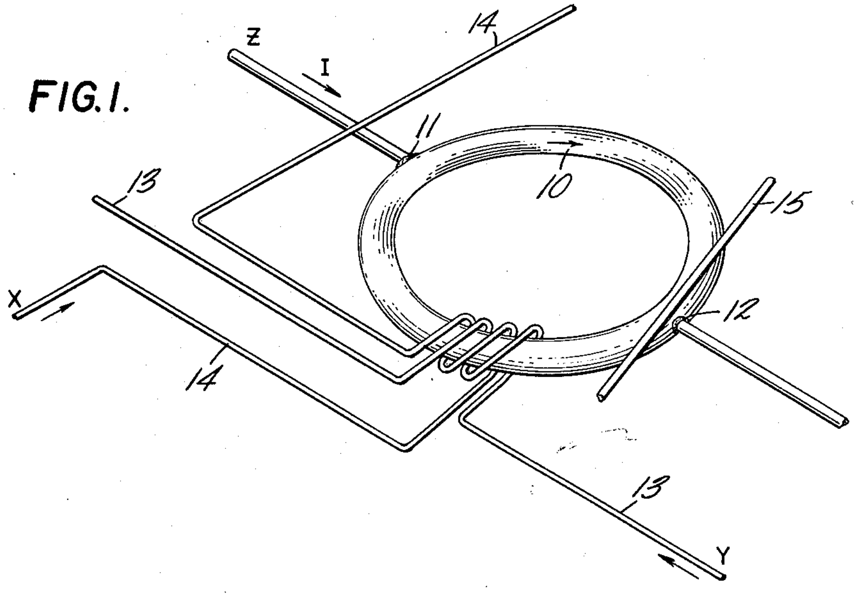
FIGURE 1 is a perspective view of a memory unit constructed in accordance with the principles of the invention.

Referring now to an illustrative embodiment of a single storage unit, a ring 10 of any suitable material capable of exhibiting a superconductive characteristic is formed with any suitable cross-section. A wire, which will be termed a Z wire, positioned in the same horizontal plane as the storage unit 10 is joined to the unit at the points 11 and 12, respectively, by any suitable means such as, for example, by welding, soldering or the like. A wire 13, which will be termed a Y wire, forms a coil, or loop, about one side of the ring unit 10, as shown in FIGURE 1. Similarly, a wire 14, which will be termed an X wire, is formed into a loop, or coil, superimposed about the Y coil formed by the wire 13 on one side of the ring unit 10. It is necessary that the wires 13 and 14 be interwound or superimposed about the same point on the ring unit 10 in such a manner that magnetic fields developed by electric currents flowing in each of the wires, respectively, will be additive. Also, the magnetic field developed by each of the X and Y coils separately will be insufficient to switch to the resistive state the portion of the unit 10 which they couple, and therefore, it is necessary that both coils be pulsed coincidently. It should be noted further that the wires 13 and 14 are arranged with neither being magnetically coupled to ring 10 so that currents in these wires do not induce currents in the ring.

Positioned adjacent the ring unit 10 on the opposite side from the windings formed by the wires 13 and 14 is a sense wire 15. All of these wires 13, 14 and 15 are insulated electrically from the ring unit 10.

The operation of the ring unit is as follows. A source of electric current is applied to the Z wire as indicated by the arrow I. The inductances of the two halves of the ring unit 10 are equal so that, with the ring entirely superconductive, the current I divides equally and one-half I flows in one parallel branch and one-half I flows in the other parallel branch. Concurrent pulses may then be applied to both wires 13 and 14 to cause one side of the ring unit 10 to become resistive, resulting in the total current I flowing in the opposite half of the ring unit 10. Now the electric current pulses applied to the wires 13 and 14 are removed and, then, the current flowing in the Z wire is terminated. In this manner, a clockwise flow of current I/2 is created around the ring unit 10 and may be designated arbitrarily as a binary "1." It should be noted that it is not necessary to maintain the pulses on wires 13 and 14 until all of the current I is shifted to the non-resistive half of the ring. To store a persistent current it is only necessary that the current be divided between the superconductive paths in a ratio other than the ratio of the inductances of the paths before the current in the Z wire is terminated. However, the magnitude of the persistent current will be greater if the current pulses on lines 13 and 14 are maintained until all the current is shifted to the non-resistive half of the ring.

In order to sense the presence of this stored current in the ring unit 10, both of the X and Y wires 13 and 14, respectively, are pulsed to render one-half of the ring unit 10 again resistive, thus stopping the clockwise flow of current. The decay of the current I/2 in the ring unit causes a changing magnetic flux linking the sense wire 15 which induces a voltage in the sense wire 15 to produce the desired read-out.

Figure 2:
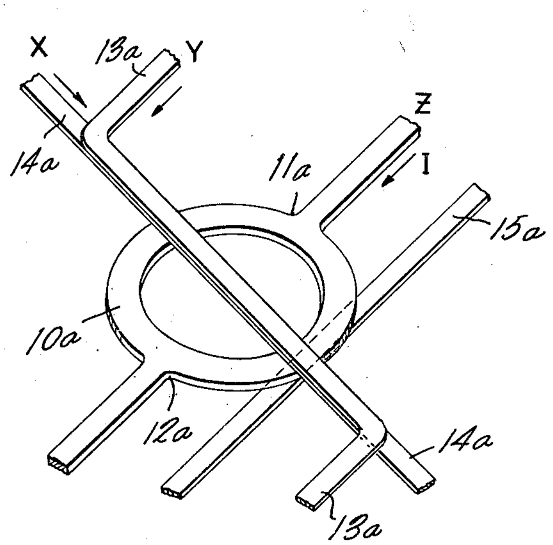
FIGURE 2 is a modification of the unit shown in FIGURE 1 wherein the unit is embodied in a relatively thin film.

FIGURE 2 of the drawings shows the ring unit of FIGURE 1 in a slightly different structural form to present a flat film version of the device. Referring now to FIGURE 2, the numeral 10*a* denotes the ring unit which is a thin film of material. The Z wire is also a thin ribbon formed integrally with the ring 10*a*. The X and Y wires 13*a* and 14*a*, respectively, are metallic ribbons which are laid on top of the ring unit 10*a* but insulated electrically therefrom by suitable spacing from the unit 10*a* or by a suitable dielectric material. The conductors 13*a* and 14*a* are placed one above the other in a superimposed relation so that the magnetic fields produced by these conductors are additive to produce a magnetic field sufficient to render the adjacent portion of one side of the ring unit 10*a* resistive when these wires are pulsed coincidently. In order that resistance be introduced in only one side of the ring unit 10*a* between terminals 11*a* and 12*a* when the conductors 13*a* and 14*a* are concidently energized, the ring is fabricated with a "soft" superconductor material forming one-half of the unit and a "hard" superconductor material forming the other half of the unit. The terms "hard" and "soft" superconductors are relative, being employed to indicate materials requiring different intensities of magnetic field to cause a transition into a normal or resistive state at the operating temperature. For example, at an operating temperature of 4.2° K. both tantalum and niobium are superconductive but the former is considered a soft superconductor since a field intensity of 100 oersteds or less is sufficient to drive it normal and the latter material is considered a hard superconductor since a field intensity in excess of 1000 oersteds is required to drive it normal. As mentioned previously, the pulsing of either wire 13*a* or 14*a* independently will not produce a magnetic field sufficient to render even the soft superconductor material in one side of the ring unit 10*a* resistive.

FIGURES 3, 4, 5 and 6, together, show how twenty-seven of the ring units 10 can be arranged in a three-dimensional system and, thus, comprise a three-dimensional memory array or system capable of storing nine words of three binary bits each.

Figure 3:
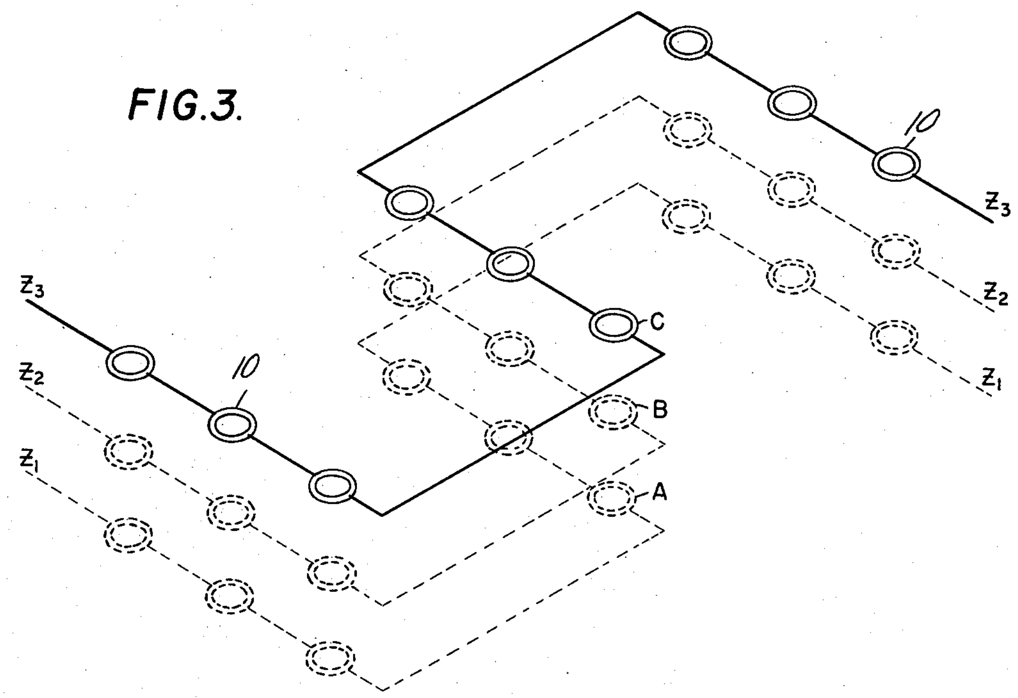
FIGURE 3 is a perspective view of a three-dimensional system showing the Z wire in one of the horizontal planes.

Referring now to FIGURE 3 in particular, three horizontal superimposed Z planes contain nine ring units each. Only the Z wire is shown in FIGURE 3 by solid line to illustrate more clearly how it interconnects each of the ring units 10 in a single plane. The other Z planes shown in dotted lines have the ring units interconnected in the same manner.

It should be emphasized at this point that the designation of "planes" is for the sole purpose of clarity in description. The individual superconductive storage units 10 may be located physically in any desired geometrical position or pattern consonant with the realization of the electrical pattern of the various interconnections described herein.

Figure 4:
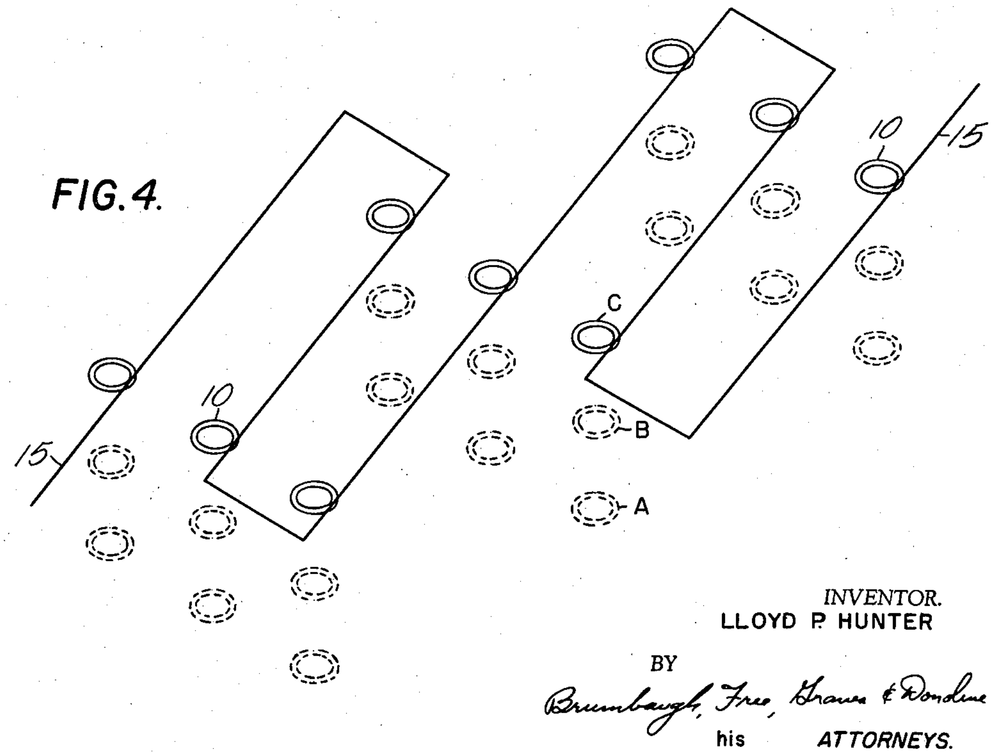
FIGURE 4 is a perspective view of a three-dimensional system showing the positioning of a sense wire throughout one of the horizontal planes.

FIGURE 4 shows how the sense wire 15 is positioned adjacent each of the nine rings 10 in one of the three superimposed horizontal planes. Of course, the other two horizontal planes are also equipped with a similarly arranged individual sense wire 15, only one being shown for simplicity.

Figure 5:
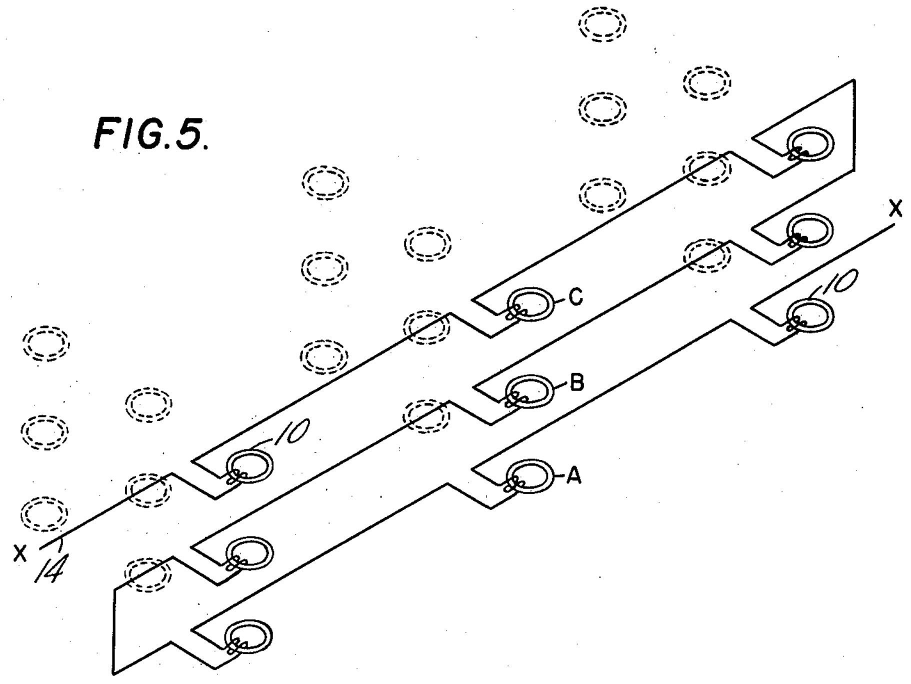
FIGURE 5 is a perspective view of a three-dimensional system showing the X wire threaded throughout one vertical X plane.

FIGURE 5 shows how the X wire 14 is threaded through the nine ring units 10 in one of the three X planes to interconnect the various X windings in this plane. The other two X planes, of course, will be wired in the same manner.

Figure 6:
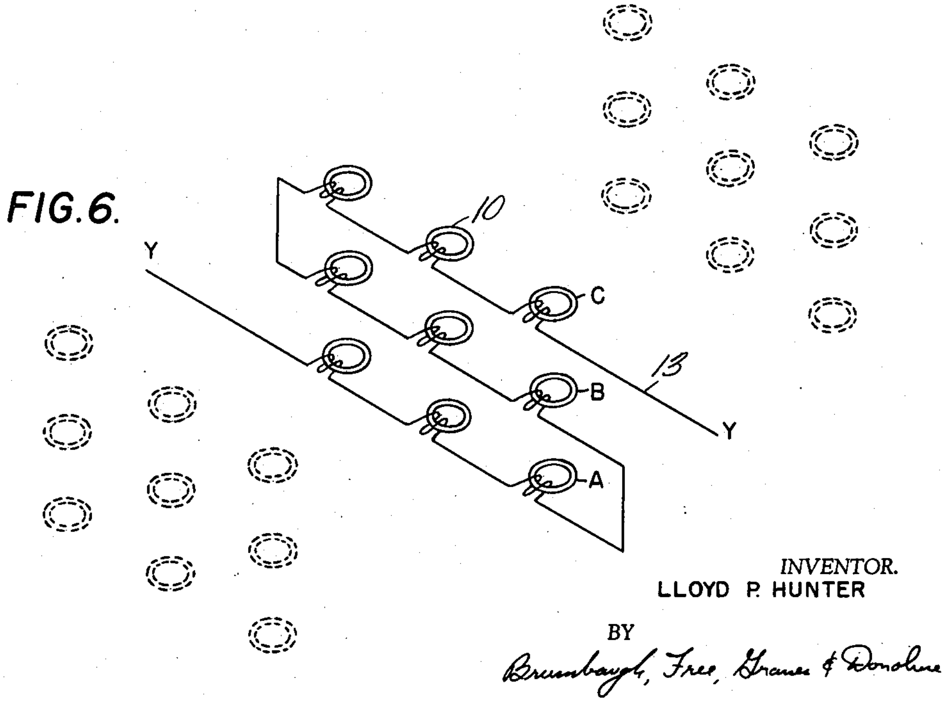
FIGURE 6 is a perspective view of a three-dimensional system showing a Y wire threaded throughout one vertical Y plane.

FIGURE 6 shows how the Y wire 13 interconnects the Y windings on the nine ring units 10 in one of the three Y planes. Here, also, the other two Y planes are each arranged with similar Y wires 13. As previously mentioned, the X and Y windings are wound together around one side of the ring units 10 so that the magnetic field from both wires will be additive.

As referred to previously, the designation of X, Y and Z "planes" is not intended to suggest a physical or geometrical limitation. Such references indicate the particular manner of interconnecting the various ring units and the windings associated wtih each unit. For descriptive purposes and for the purposes of better understanding the essential character of the invention, these geometrical planes may be considered as corresponding to non-geometrical "parameters of entry." Of course, it is deemed obvious that any desired number, quantity of value of X, Y and Z parameters of entry may be provided in any matrix or system formed in accordance with the invention.

A more complete understanding of the invention may be obtained by referring to FIGURES 3, 4, 5 and 6 taken together to indicate a complete matrix for a memory storage system and from the following detailed description of one complete cycle of operation. Assume, for example, that the three bit binary word 110 is to be stored in the three ring units designated A, B and C. Assume, further, that the FIGURES 3, 4, 5 and 6 each represent the same twenty-seven ring units 10, and the presence of a circulating current in any ring unit 10 arbitrarily represents a binary "1," whereas no current in any ring unit 10 arbitrarily represents a binary "0." Now, to store the word 110, a binary "1" will be stored in each of the ring units A and B, and a binary "0" will be stored in the ring unit C. To accomplish this, a source of electric current (not shown) is applied to the wires $Z_1$ and $Z_2$, respectively, FIGURE 3, and no electric current is applied to the wire $Z_3$. With this current flowing in the wires $Z_1$ and $Z_2$, a current pulse is applied to the X wire, FIGURE 5, and, coincidently, to the Y wire, FIGURE 6. As previously mentioned, coincident pulses in the X and Y wires are necessary to render one-half of any ring unit 10 resistive. Therefore, with current pulses applied only to the X and Y wires, shown in FIGURES 5 and 6 taken together, the ring units A, B and C will be the only ones actuated. However, since a current is flowing only in the $Z_1$ and $Z_2$ wires, it is only in the ring units A and B that this current is directed entirely in one-half of these ring units. Since the ring unit C has no Z current flowing in it, the concurrent X and Y pulses are ineffective for storing any persistent current in this ring C. It may be seen now that with the X and Y wires being pulsed, the $Z_1$ and $Z_2$ currents in the ring units A and B, respectively, are only in one-half of the units. To complete the STORE cycle, the current pulses in the X and Y wires are removed and then the currents in the $Z_1$ and $Z_2$ wires are removed. With all currents removed, a persistent current I will remain circulating in the ring units A and B, respectively.

During the above-described operation certain unselected units, that is, units other than those designated A, B and C, which may or may not be storing a persistent current are subjected to a current supplied by the Z line. However, these units are not affected by the read-in operation and upon its termination reassume their initial condition. This is due to the fact that in order to permanently disturb the condition of these ring units, it is necessary to introduce resistance and none of the units other than those designated A, B and C are subjected to both X and Y pulses concurrently and, therefore, all but these three units remain entirely superconductive during the read-in operation.

To sense, or read-out, the information just stored in the units A, B and C, the wires X and Y are again pulsed. The coincident pulsing of the ring units A, B and C renders that portion coupled by the X and Y windings resistive and, therefore, the current circulating in the units A and B will be dissipated. The reduction of this current I in the units A and B will induce a voltage in each of the sense wires 15 coupling the ring units A and B, respectively, whereas no voltage will be induced in the sense wire associated with the ring unit C because there was no persistent current I circulating in the unit initially. The result now is a voltage developed in each of the sense wires coupled to the units A and B and no voltage in the sense wire coupled to the unit C. Thus, the output will be the word 110 which was the word stored initially.

A unique characteristic of the present memory matrix or system is that it is not necessary to erase information in the various storage units before writing into the system. This is because the normal resistance developed by the magnetic effect of the concurrent X and Y electric current pulses will dissipate any circulating persistent current that may be flowing in a memory ring unit. This system is capable, therefore, of reading and writing an entire word at a time. However, it is not capable of writing or changing a single digit of a word without rewriting the entire word in the corrected form. In other words, entire words must be read simultaneously.

In the event the various planes of a system constructed in accordance with the invention are placed relatively close together, it will be necessary to insert superconducting material between respective planes to prevent the magnetic field linked by one loop of a Z winding from also linking the sense winding of an adjacent plane. In this manner respective planes may be kept electrically and magnetically isolated.

The signal strength in the present memory system can be determined by the size of the Z current as well as by the speed of switching. Even though the description implies a 2:1 selection ratio, the abruptness of the superconducting transition will allow selection of triple or quadruple coincidence of selection currents if more than a single coincidence is desired.

The exact configuration illustrated is regarded as the optimum, but some of the desirable results inherent in this disclosure may be obtained by various slight modifications including some departure from the exact configuration shown. Hence, all such configurations and variations are intended to be included within the scope of the invention.

I claim:

1. A three-dimensional superconductive memory comprising a plurality of superconductive storage rings for current which persists in the absence of externally applied electrical energy, said rings being arranged in X, Y and Z planes and being each provided by superconductive material bounding an aperture in such material, and each such ring having input and output terminals and first and second paths through the ring between those terminals, a plurality of X selection conductors for said memory each arranged in magnetic field applying relationship to the first path of each of the storage rings in a corresponding one of the X planes in said memory, a plurality of Y selection conductors for said memory each arranged in magnetic field applying relationship to the first path of each of the storage rings in a corresponding one of the Y planes in said memory, means conductively connecting the input terminal and the output terminal of the storage rings in each Z plane in the memory to thus connect all of the rings in each Z plane in series circuit relationship, a plurality of Z conductors each conductively connected to the series connected storage rings in a corresponding one of the Z planes in said memory, means for selectively applying and removing current to a particular one of said X selection conductors and a particular one of said Y selection conductors to introduce resistance into the first path of a selected storage ring in each Z plane with which the particular X and Y selection conductors are in magnetic field applying relationship, means for selectively applying currents to selected ones of said Z selection conductors to cause current to flow into, through and out of the series connected storage rings in the corresponding Z planes, said current dividing between the paths of the unselected storage rings and flowing entirely in the second path of the selected storage rings in those planes for which the Z selectoin conductor has a current applied thereto, said current applied to said X and Y selection conductors being removed thereafter said current applied to said Z selection conductor being removed, whereby upon removal of current from the Z selection conductor, there is established in each of the selected storage rings a current which flows in a loop around the aperture of the ring, and which persists in the absence of externally applied electric energy.

2. The invention of claim 1 wherein a sense conductor is arranged adjacent each of said storage rings, each of said sense conductors being subject to the magnetic field produced by persistent current flowing in a loop in said ring and effective to produce an induced output in response to a change produced in said persistent current by energization of the X selection conductor and Y selection conductor for the ring.

References Cited in the file of this patent

UNITED STATES PATENTS

| | | |
|---|---|---|
| 2,736,880 | Forrester | Feb. 28, 1956 |
| 2,740,949 | Counihan et al. | Apr. 3, 1956 |

| | | |
|---|---|---|
| 2,832,897 | Buck | Apr. 29, 1958 |

FOREIGN PATENTS

IBM Journal, October 1957, pages 295–302 and 304–308 relied on.

Electrical Manufacturing, Feburary 1958, pages 78–83 relied on.